April 15, 1924.
L. CAUTE
1,490,799
MECHANISM FOR ACTUATED ENDLESS TRACK MOTOR VEHICLES
Filed Oct. 24, 1921    2 Sheets-Sheet 1
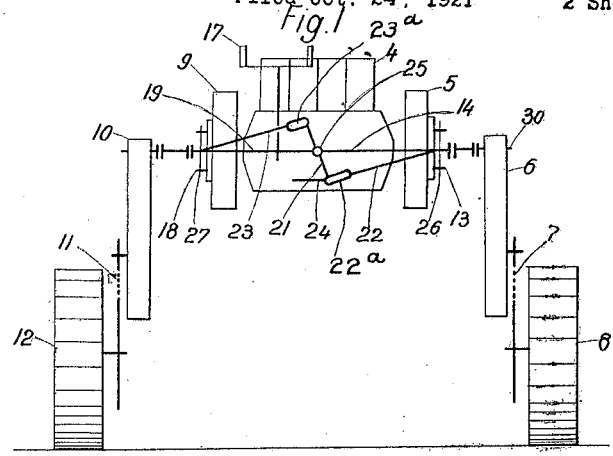
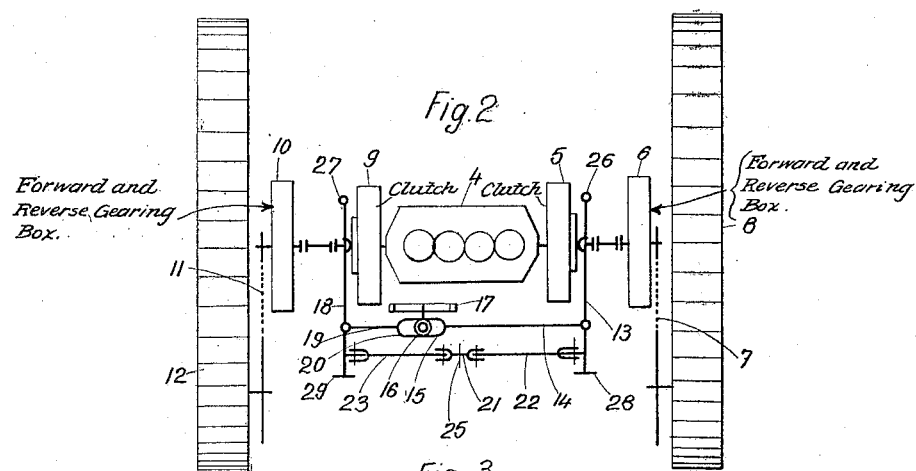
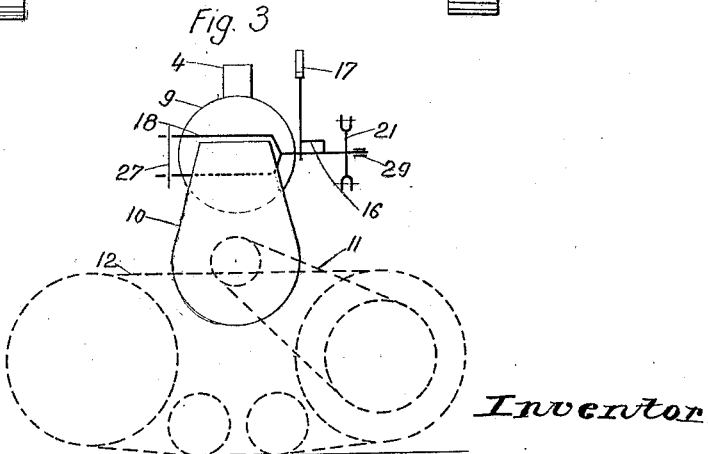
Inventor
L. Caute,
By Marks & Clerk
Attys.

April 15, 1924.
L. CAUTE
1,490,799
MECHANISM FOR ACTUATED ENDLESS TRACK MOTOR VEHICLES
Filed Oct. 24, 1921   2 Sheets-Sheet 2
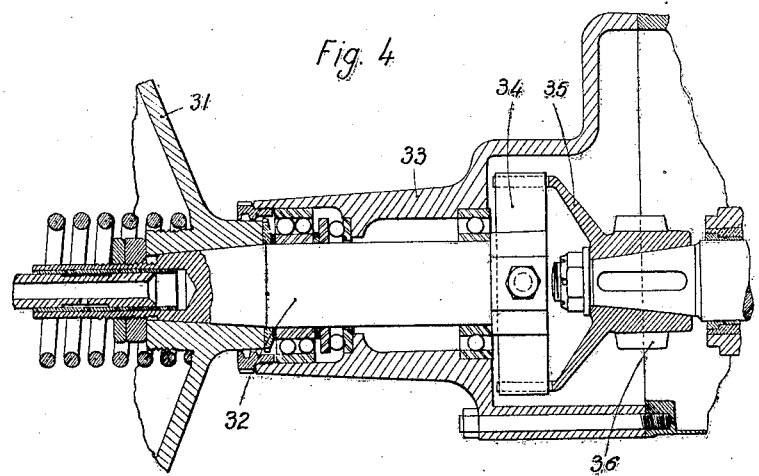
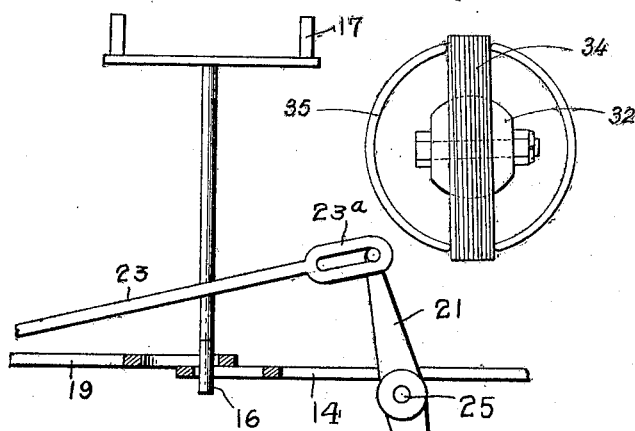
Inventor
L. Caute,
By Marks & Clerk
Attys.

Patented Apr. 15, 1924.

1,490,799

UNITED STATES PATENT OFFICE.

LOUIS CAUTE, OF PARIS, FRANCE, ASSIGNOR TO SOCIETE DE CONSTRUCTION DU TRACTEUR VIGNERON GEORGES VIDAL, OF MONTPELLIER, HERAULT, FRANCE, A CORPORATION OF THE FRENCH REPUBLIC.

MECHANISM FOR ACTUATED ENDLESS-TRACK MOTOR VEHICLES.

Application filed October 24, 1921. Serial No. 509,866.

*To all whom it may concern:*

Be it known that I, LOUIS CAUTE, a citizen of the French Republic, residing at Paris, Department of the Seine, in France, and having P. O. address 26 Rue des Dames, in the said city, have invented certain new and useful Improvements in Mechanisms for Actuated Endless-Track Motor Vehicles; and I do hereby declare the following to be a full, clear, and exact description of the invention, such as will enable others skilled in the art to which it appertains to make and use the same.

The present invention has for its object an improved mechanism for operating endless track automobile vehicles and particularly apparatus for which it is sufficient to provide instantaneously only a limited number of speeds and which can be turned round in one place by putting one of the tracks in forward operation and the other track in reverse operation at an equal speed.

The accompanying drawings show diagrammatically by way of example, one form of the mechanism used with an explosion motor.

Figure 1 is a rear elevation of a vehicle having mechanism according to the invention, Figure 2 is a plan view thereof, Figure 3 is a side elevation, Figure 4 shows one constructional form by way of example of an elastic coupling between one of the ends of the motor shaft and its clutch and Figure 5 is a transverse section of the elastic coupling. Figure 6 is a rear elevation of the clutch controlling means.

In the drawings, 4 is the motor, one of the two extremities of the shaft of which carries a clutch 5 coupled to a change-speed reduction gear box 6, driving by means of a transmission gear 7, one track 8 of the vehicle. The other extremity of said motor shaft carries a clutch 9 which is coupled to a change-speed reduction gear box 10, which drives through a transmission gear 11 the other track 12 of the vehicle. The two clutches are identical as are also the two gear boxes and the two transmission gears, respectively. Each gear box is provided with a lever (not shown) which permits the gearing in said box to be independently set to the desired speed notch. Generally, each box will be constructed to give only a forward speed and a reverse speed. The two clutches may be operated as desired either together for producing the stopping or the starting of the vehicle or separately for steering. To obtain this double result the clutch fork 13 is operated by a rod 14 terminating in a long slot 15 engaging the stud 16 of a crank rigid on the steering post 17. The fork 18 of the other clutch is actuated by a rod 19 terminating in a long slot 20, also engaged by the stud 16 of the crank on the steering post. When the steering post is turned in one direction, the stud 16 pulls on one of said rods and slides along the slot of the other rod, but when the steering post is moved in an opposite direction, the stud 16 pulls on the last mentioned rod and slides along the slot of the other rod. To obtain simultaneous control of the two clutches, the forks 13 and 18 are pivotally connected to the outer ends of links 22 and 23, the inner ends of which are provided with elongated slots $22^a$ and $23^a$ engaging cranks or pins provided upon the opposite ends of a double ended lever or rocking beam 21. The rods 22 and 23 are of equal length so that the rocking of the beam 21 will impart equal movement to the forks 13 and 18. Each fork acts directly upon the friction member of the corresponding clutch. A rod 24 transmits the movement of a clutch pedal to the beam. The latter has its pivot 25 rigidly fixed to the casing of the motor. The respective axes 26 and 27 of the clutch forks 13 and 18 are fixed to some portion of the machine frame (not shown) and if necessary, the free extremities of these forks are guided by respective slides 28 and 29 rigidly carried on the casing of the motor. The two clutch forks are perpendicular to the axis of the motor and equi-distant from the axis of the beam. Under these conditions the operation of the beam communicates identical movements respectively to the two forks and very exact operations of clutching and declutching are thus obtained simultaneously and quite independently of the flexing of the frame of the apparatus, being protected from the disturbing influence of dilations. Further, owing to the elongated slots, the operations obtained either by the clutching pedal or by the steering member are completely independent. The starting of the motor is obtained by means of a crank which is engaged with the extremity 30 of the shaft of one of the gear boxes prolonging the shaft of the motor after the levers of each of the gear boxes have been set to the neutral notch. Two brakes, one for each track and independently operated, are provided for braking the vehicle and for steering it when the power of the motor is stopped, namely, when descending an incline.

The general similarity of the mechanisms operating each of the tracks need not be extended to the method of driving the clutches by the motor shaft, although this similarity may exist.

The method of driving may be of any desired form. Preferably, one of the clutches and more particularly that which is on the side which is usually considered the back part of the motor, is directly carried by the extremity of the shaft, as is the case in explosion motors of the ordinary automobile type. The other clutch may be also directly carried by the second extremity of the motor shaft but for the distribution side of a motor of the automobile type in particular, it can be advantageously installed on a short shaft separate or distinct from the motor shaft, preferably arranged in line with this shaft and connected to the extremity of the latter in any desired manner but preferably by an elastic device. This short shaft can be supported on the extremity of the motor shaft or the whole member of the coupling may be rigid on this extremity of the motor shaft. Furthermore, the short shaft can be supported either completely or partly, notably in the case where the independent short shaft has a first support on the extremity of the motor shaft, by a suitable arrangement of the casing of the motor or of a casing carried on the main casing of the motor, namely, the distribution casing, in ball or roller bearings or even in independent bearing.

One form of this mounting of the clutch is shown by way of example in Figures 4 and 5.

If the end of the crank shaft of the motor is considered (distribution end) the fly wheel clutch 31 is fixed on a short shaft 32 distinct from the shaft of the motor and turns in ball bearings housed in the distribution casing 33 of the motor and is provided with a number of plate springs 34 engaging in the coupling bell 35 rigidly connected with the distribution pinion 36 of the motor. The drive is thus obtained elastically by a joint of the Oldham type.

In the example considered the second clutch will be directly connected to the second extremity of the crank shaft of the motor according to current practice for the installation of a clutch on the end of the crank shaft of an explosion motor.

Claims:
1. In combination, a motor driven shaft, clutches arranged to be driven from the opposite ends of said shaft, forward and reverse gearing adapted to be actuated by said clutches, endless tracks driven by said gears, and means for independently or simultaneously throwing said clutches into or out of operation, said means for operating the clutches including a plurality of pivotally mounted levers, a rod connected to each of said levers and having a slotted end, and an actuating member engaging the slotted ends of said rods for independently actuating the rods.

2. In combination, a motor driven shaft, clutches arranged to be driven from the opposite ends of said shaft, forward and reverse gearing adapted to be actuated by said clutches, endless tracks driven by said gearings, and means for independently or simultaneously throwing said clutches into or out of operation, said means including a plurality of pivotally mounted levers, rods pivotally connected to said levers, a double armed pivotally mounted lever, and slotted pin connections joining certain ends of said rods to the ends of said double armed lever.

3. In combination, a motor driven shaft, clutches arranged to be driven from the opposite ends of said shaft, forward and reverse gearing adapted to be actuated by said clutches, endless tracks driven by said gears, and means for independently or simultaneously throwing said clutches into or out of operation, said means including a plurality of pivotally mounted levers, rods connected to said levers and having slotted ends, an actuating member engaging the slotted end for independently actuating said rods, other rods pivotally connected to said levers, and a double armed pivotally mounted lever having slot and pin connections with the ends of the second mentioned rods.

4. In combination, a motor driven shaft, clutches arranged to be driven from opposite ends of said shaft, forward and reverse gearing adapted to be actuated by said clutches, endless tracks driven by said gears, means for independently or simultaneously throwing said clutches into or out of operation, and a shaft arranged in alignment with the motor driven shaft and flexibly connected to the latter, one of said clutches being mounted on the second mentioned shaft.

In testimony whereof I affix my signature.

LOUIS CAUTE.